June 12, 1962     J. D. LINDABERY     3,039,106
RECORDER

Filed Oct. 15, 1958     2 Sheets-Sheet 1

INVENTOR
JOHN D. LINDABERY
BY
*John A. McKinney*
ATTORNEY

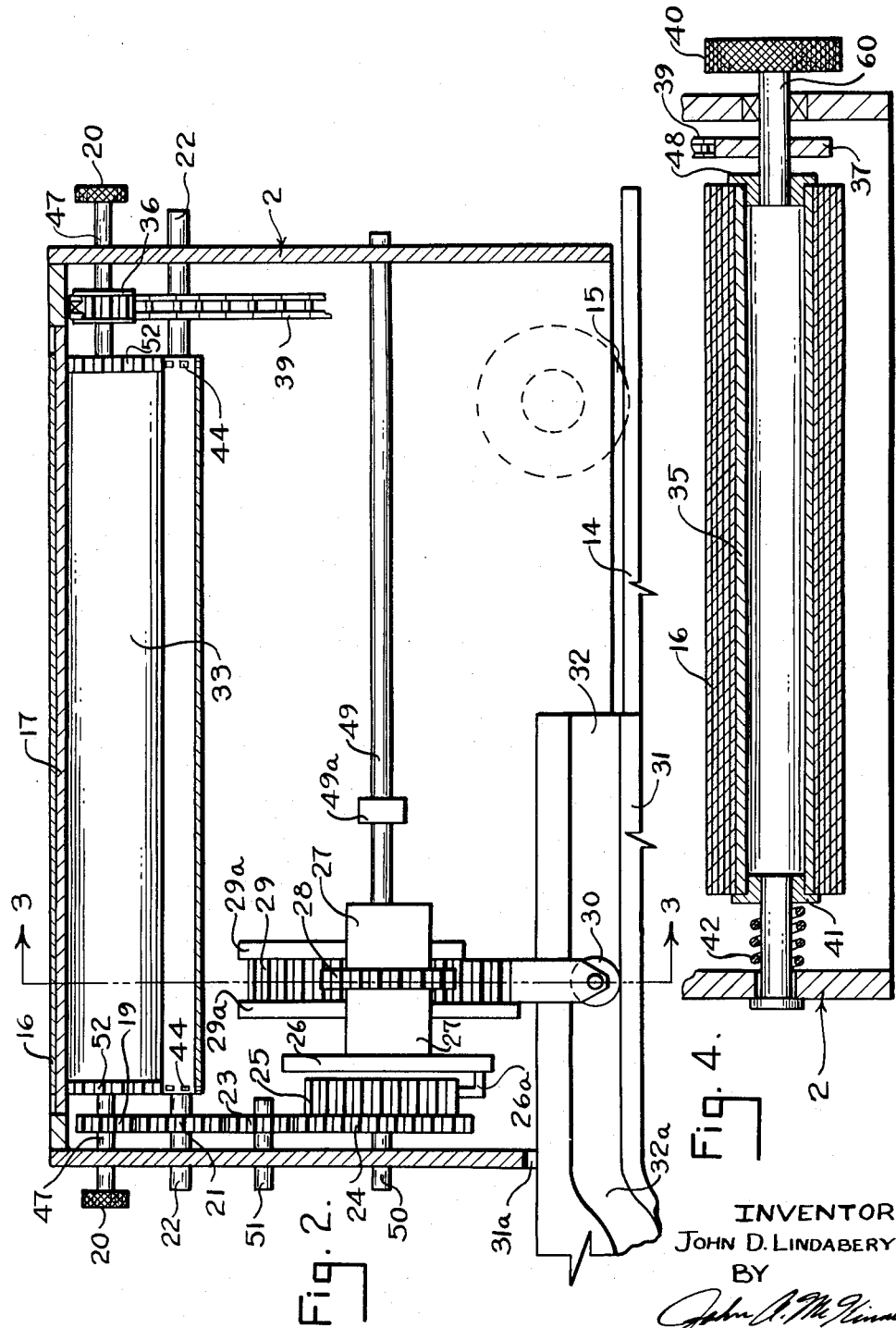

United States Patent Office 3,039,106
Patented June 12, 1962

3,039,106
RECORDER
John D. Lindabery, Somerville, N.J., assignor to Johns-Manville Corporation, New York, N.Y., a corporation of New York
Filed Oct. 15, 1958, Ser. No. 767,439
5 Claims. (Cl. 346—113)

This invention relates to recording mechanisms and, more specifically, it relates to an apparatus for indexing the graph paper on a recorder so that a plurality of graphs recorded on the paper may be viewed concurrently for comparison.

In linear-type recording mechanisms known at the present date, in order to view a plurality of graphs recorded on the graph paper by the recording apparatus, it is necessary to roll back the paper and compare the various recorded graphs during such rolling back. Also, heretofore, machines or recorders, that are set up to automatically index the recording paper, have a fixed degree of indexing so that the amount or degree of indexing cannot be altered without complete redesign of the machine or by a substitution of a plurality of indexing elements.

A primary object of this invention therefore is to provide a novel type of indexing mechanism in a recording machine whereby the recording paper is indexed at relatively small increments so that a plurality of graphs recorded thereon may be viewed at one time for comparative purposes.

An additional object of this invention is to provide a novel type of indexing mechanism used in indexing graph paper on a recording machine so that the degree or amount of indexing of the graph paper can be altered merely by a substitution of one of its parts.

In brief, the invention comprises an indexing mechanism for a recording machine having a carriage movable relative to a recording stylus wherein cam means are provided which operate a ratchet and pawl mechanism connected to rotatable indexing gears on the recording paper rollers. The cam mechanism is related to the gears in such a manner that in one direction of movement of the carriage relative to the stylus, no movement or indexing of the recording paper occurs allowing thereby proper recording by the stylus upon the graph paper; upon reverse movement of the carriage relative to the stylus, the cam mechanism is operated in such a manner that the ratchet and pawl mechanism actuates the rotatable gears on the paper rollers thereby to index the graph paper the desired amount. Furthermore, one of the elements of the cam mechanism is readily replaceable so that the degree or amount of movement of the graph paper can be altered to fit particular requirements, that is to say, where two or three recorded graphs may be viewed at the same time or 10 or 12 recorded graphs may be viewed at the same time depending upon the amplification factor of the transmitter and the amount of expected variance from the reference line traversed by the recording stylus during recording.

Further objects, additional advantages, and the nature of the invention, will be readily apparent from the foregoing description and the following, more detailed description and attached drawings wherein:

FIG. 2 is an enlarged cross-sectional view illustrating the drive mechanism of the indexing apparatus of the present invention and taken along lines 2—2 of FIG. 3;

FIG. 4 is a cross-sectional view along lines 4—4 of FIG. 3.

Figure 1:
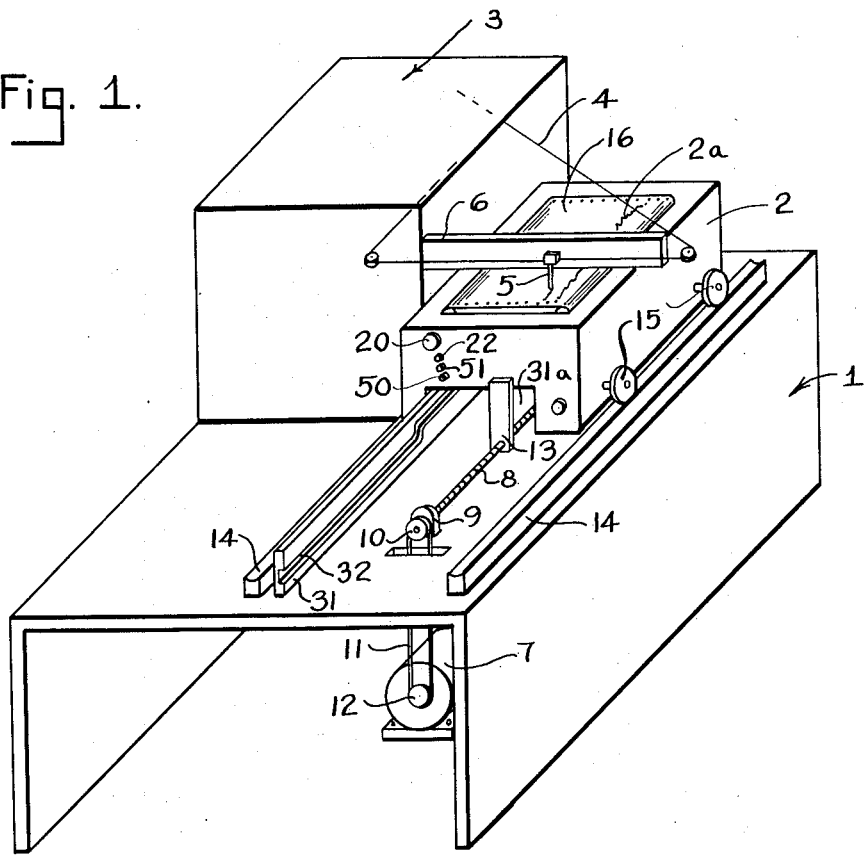
FIG. 1 is a pictorial view of the recording mechanism.

Referring to FIG. 1, a frame 1 has mounted thereon a carriage 2 in which is mounted the recording paper 16 on which the stylus or needle 5 records the appropriate data. The stylus receives its information from a data transmitter or combination data transmitter and receiver 3 via actuating drive linkage 4. The stylus 5 is mounted on a stylus holder 6, so that upon receipt of information transmitted by drive 4, the stylus moves along the holder 6, that is to say, in a path parallel to the axis of the holder 6. The stylus 5 is fixed against transverse movement relative to its holder 6 or the data transmitter or receiver 3. The stylus 5 also has associated therewith lifting or tilting mechanism (not shown) which, upon reverse movement of the carriage 2, tilts or elevates the stylus 5 out of recording position, thereby preventing damage to the recording paper.

Carriage 2 is mounted on carriage guides 14 by a plurality of carriage wheels 15 so that the carriage is movable along the guides or rails 14 by rotation of the wheels. To accomplish this linear movement of the carriage in a predetermined time sequence, a drive motor 7 is operatively connected thereto. The operative linkage between motor 7 and carriage 2 comprises a screw 8 driven by the motor via pulleys or sprockets 10, 12 and belt or sprocket chain 11. The carriage screw 8 is mounted on bearings 9 and is circumscribed by a carriage nut 13 fixedly mounted to carriage 2. Thus, upon rotation of screw 8 by drive motor 7, nut 13 and the attached carriage 2 are moved in a linear direction on the guide rails 14 parallel to the axis of screw 8 and parallel to the reference lines on graph paper 16 relative to which lines the stylus 5 records.

Figure 3:
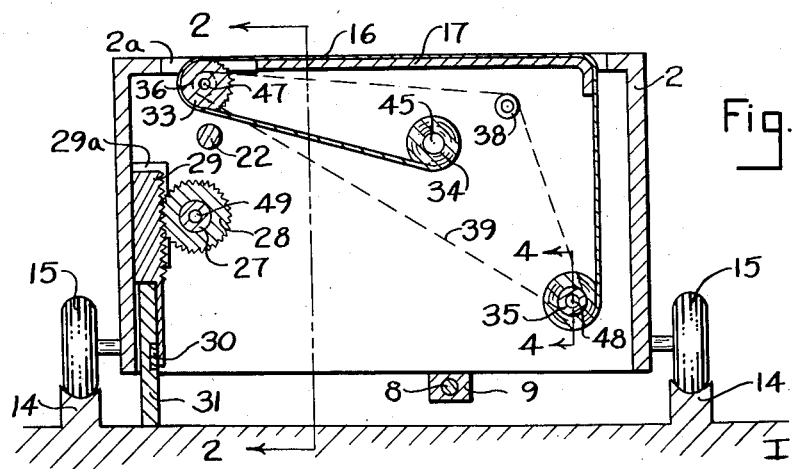
FIG. 3 is a cross-sectional view mainly of the paper and its retaining rollers used in the recording machine and taken along lines 3—3 of FIG. 2.

Within the carriage 2 is mounted the graph or chart paper 16; portions thereof pass by a window 2a in the carriage exposing such portions of the paper to view. The paper 16 is fed from a feed roller 34 (FIG. 3), passed around an idler and indexing roller 33, supported by a table or support 17 mounted within the carriage subjacent the window 2a, and finally passed around a receiving roll 35. The feed roller 34 is mounted on a pair of supports or bosses 45 attached to the carriage frame; the indexing roller 33 is mounted on a shaft 47 which has a pair of external knobs 20 attached thereto for manual rotation of the roller; the receiving roll 35 (FIG. 4) is mounted between a plug 48 and a plug 41 biased in a direction inwardly of the compartment of the carriage by spring 42. Plug 48 is attached to a shaft 60 on which is located an external manual rotating knob 40 and a sprocket 37. A similar sprocket 36 (FIG. 2) is mounted on shaft 47, and a chain drive 39 interconnects the two gear wheels 36, 37 via an idler sprocket 38. Thus upon roation of either of the manual rotating knobs 20, 40 not only is the attached roller 33 or 35 rotated, but the opposite roller also is rotated within the carriage by the chain drive 39.

Secured to the frame 1 adjacent the rear side wall of the carriage 2 is a cam bar 31 having a cam guide 32 cutout therein; the carriage 2 has a cutout 31a adjacent the bar thereby allowing the carriage to pass over the bar and also screw 8 without interference. The guide 32 functionally operates to actuate a cam roller or follower 30 thereby reciprocating an attached rack 29 slidably mounted between a pair of rack guides 29a attached to a rear side wall of the carriage. The rack is operatively connected to a shaft 49, supported by a bearing 49a, via a circular gear 28 in mesh with the rack 29. The gear 28 is located in place by a pair of spaced bushings 27, at one end of which is mounted a circular pawl or holder 26. Pawl 26a extends transversely from the holder 26 and is operatively engaged with ratchet gear 25 mated with a gear 24 on a shaft 50. Gear 24 is drivably connected to a roller gear 19 by a pair of idler gears 21, 23 mounted on shafts 22 and 51 respectively. Indexing mechanism 52, on either end of roller 33, is operatively engaged with the perforations 44 in the paper 16 so that upon rotation of the shaft 47 by the rack 29 and the associated mechanism, the indexing mechanism rotates the proper amount to move the paper 16 along the upper face of support 17. When the carriage 2 is moved to the right, in an indexing return to recording position, follower 30 rides within slot 32 and reciprocates rack 29 during upward follower travel in the curve portion 32a of the cam slot 32. Upon downward movement of the rack bar 29, as occurs on a recording run of carriage 2, that is, a run to the left (FIG. 2), gear 28 and pawl holder 26 are rotated but the pawl 26a is arranged relative to ratchet gear 25 in such a manner that no rotation of the gears 24, 23, 21, and 19 occurs. Upon completion of a full recording run from extreme right to left (FIG. 2) and during the return of the carriage relative to the stylus 5, which has been lifted out of contact with the paper as aforementioned, for another cycle of recording, follower 30 rides up the cam slot portion 32a and operates to reciprocate rack 29 to its original position and also to rotate gear 28. This time, however, ratchet and pawl mechanism 25 and 26a are operatively interlocked or operatively engaged so that rotation of gears 24 and 19 occurs. Since gear 19 is rotated, shaft 47 and indexing gear 52 are also rotated to drivably engage the perforations 44 in the paper 16 thereby to rotate the paper one full indexing increment. Upon reaching its end of return travel, carriage 2 is in recording position, ready again to receive data from the transmitter 3.

The amount or degree of movement of the recording paper 16 or indexing of the paper 16 is governed by the drop of slot portion 32a; in the event that the degree or amount of index is desired to be changed, bar 31 is removed from adjacent the carriage and replaced by a bar having a lesser or greater drop at portion 32a producing the desired indexing. This can easily be done merely by loosening the means of attachment of the bar 31 to the frame 1 and insertion and retightening of the new bar having a different type of cam guide 32 therein.

In the complete operation of the system, a feed roll 34 of paper is inserted within the carriage. The graph paper is wrapped around indexing roller 33, is passed over and supported on table 17, and is then wrapped around the receiver roller 35 to be accumulated thereon. The proper cam guide 32 has been previously secured to the frame 1 to produce the desired indexing of the paper. Carriage 2 is at the extreme right (FIG. 2) or rearward (FIG. 1) position, ready to begin a recording cycle. Motor 7 is operated to rotate screw 8 causing carriage 2 to move at a predetermined rate along the bars or carriage guides 14. Simultaneously, information is received by the stylus 5 via information actuating drive 4 operatively connected to the receiver or transmitter 3. Thus, during carriage movement along guides 14, stylus 5 reciprocates parallel to the length of the paper 16 on either side of a reference line recording the proper information thereon. During carriage movement, follower 30 rotates in cam guide 32 producing no movement of rack 29 relative to gear 28. Upon entering a change of direction 32a in the cam guide, rack 29 moves downwardly producing a rotation of gear 28. However, the ratchet and pawl mechanism 25, 26a are operatively interrelated so that the pawl 26a and pawl holder 26 merely rotate freely around the ratchet gear 25. The recorder continues recording information on the graph paper 16 in this manner. Upon reaching the end of its travel, i.e., when the stylus 5 reaches or approaches the end of the paper 16, the drive motor 7 is stopped and no further movement of the recorder carriage 2 occurs. Stylus 5 is raised into retracted position as aforementioned. Drive motor 7 is reversed causing carriage 2 to return linearly to its original position; during the return travel of the carriage, cam follower 30 rides in cam guide 32 producing no relative movement between rack 29 and gear 28. Upon reaching a change of direction 32a in the cam guide 32, rack 29 is moved upwardly thereby rotating gear 28 in a reverse manner. This time, pawl 26a engages ratchet 25 to impart a positive rotation to the ratchet wheel 25. With this rotation, gear 24 is rotated producing a rotation of idler gears 23, 21 and gear 19 on the roller 33. With the rotation of the roller 33, indexing gears 52 rotate, and, being intermeshed with the perforations 44, thereby rotate the paper 16 the desired amount. Also with rotation of the roller 33, shaft 47 is likewise rotated producing a rotation of gear 36 and gear 37 via the chain drive 39 and idler 38. Thus, roller 33, through friction contact with the paper 16 and through rotation of gears 52 in notches 44 of the paper, feeds paper to the receiving roller 35. The latter roller, on the other hand, is also rotated the same angular increment, via the chain drive 39, to take up the slack produced in the paper. With the positive drive mechanism of the indexing roller 33 and the receiver roller 35, the two rollers are rotated the same angular increment; consequently, no slack is created in the paper during or after indexing, and, likewise, no additional tension or tautness is placed in the paper which might tend to produce tearing of the paper.

The degree of incrementing or indexing can be altered to fit particular requirements merely by a change in the amount of downward or upward travel of the cam follower 30 within the cam guide portion 32. Thus, if the cam guide 32 is designed to produce an indexing of one inch and the window 2a of the carriage 2 allows a 10 inch viewing of the paper 16, eight or nine recordings may possibly be viewed at the same time through the window 2a. On the other hand, if fewer recordings are desired to be viewed at the same time, or if the amount of movement of stylus 5 about the reference line is quite large, as, for example, where the amplification factor is increased, the cam guide 32 may be redesigned so that a larger drop of follower 30 is produced within guide 32a. With this larger movement, greater movemenut of rack 29 and greater rotation of gear 28 are produced thereby giving a larger indexing increment of the paper. With this type of cam guide, paper 16 is indexed a relatively large amount so that, for example, only 2 or 3 recorded graphs may be viewed at the same time.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. In a data recording machine, a carriage having a graph mounted thereon, a stylus for recording information on said graph about a reference line, means supporting the stylus so that said stylus is adapted to contact the chart during movement of said carriage, and means for mounting the carriage for continuous reciprocal translational movement parallel to the reference line, and graph indexing means mounted on said carriage and responsive during translational movement of the carriage in one direction to index said graph relative to the stylus whereby the stylus records about a new reference line.

2. In a recording mechanism, a carriage having a chart mounted thereon, means mounting the carriage for reciprocal movement, means to produce continuous linear motion of said carriage in one direction and continuous linear motion of said carriage in the opposite direction, chart indexing means mounted on said carriage and interconnecting said mounting means and said carriage, means responsive to the movement of the carriage in one direction to render the indexing means inoperative and responsive to the movement of the carriage in the opposite direction to render the indexing means operative, said responsive means comprising a plurality of rotatable gears connected to the indexing means, a cam system, and a rack gear operated by the cam system and operatively connected to the gears.

3. In a data recording system, a carriage, a chart mounted on said carriage, means mounted on said carriage for indexing said chart, means mounting said carriage for reciprocal movement, a plurality of rotatable gears connected to the indexing means, a cam guide mounted adjacent said carriage, a rack gear on said carriage mounted for reciprocal motion, a cam follower mounted on the rack gear for reciprocating in unison therewith and said follower being received within the cam guide, a rotatable gear operatively connected to the rack gear to be rotated by the reciprocal movements thereof, a ratchet and pawl mechanism interconnected between the latter gear and the gears connected to the indexing means, and the interconnection being such that drive is imparted to the rack gear by reciprocal motion of the carriage in both directions of movement but drive is imparted to the rotational gears connected to the indexing means through the ratchet and pawl mechanism only in one directional movement of the carriage.

4. In a recording mechanism, a carriage having a chart mounted thereon, means mounting the carriage for reciprocal movement, means mounted on said carriage and connected to said chart for indexing said chart, and means fixed to said carriage mounting means between the extremities thereof and in engagement with said indexing means for actuating said indexing means, said latter means being operative during movement of said carriage in one direction only.

5. The recording mechanism of claim 4 wherein the means for actuating the indexing means includes a cam means.

References Cited in the file of this patent
UNITED STATES PATENTS

| | | |
|---|---|---|
| 431,795 | Arvine | July 8, 1890 |
| 462,687 | Bruening | Nov. 10, 1891 |
| 749,305 | Lenot | Jan. 12, 1904 |
| 2,034,806 | Giffin | Mar. 24, 1936 |
| 2,825,620 | Sperry | Mar. 4, 1958 |

FOREIGN PATENTS

| | | |
|---|---|---|
| 468,177 | France | June 30, 1914 |
| 313,404 | Switzerland | May 31, 1956 |